United States Patent
Andreoletti et al.

(10) Patent No.: US 10,461,511 B2
(45) Date of Patent: Oct. 29, 2019

(54) ELECTRIC ARC EXTINGUISHING DEVICE FOR A THREE-PHASE POWER DISTRIBUTION SYSTEM AND CORRESPONDING POWER DISTRIBUTION SYSTEM

(71) Applicant: Zodiac Aero Electric, Montreuil (FR)

(72) Inventors: Rémi Andreoletti, Chelles (FR); Olivier Deshayes, Toulouse (FR); Yoan Coussaud, Les Fosses (FR)

(73) Assignee: ZODIAC AERO ELECTRIC, Montreuil (FR)

( * ) Notice: Subject to any disclaimer, the term of this patent is extended or adjusted under 35 U.S.C. 154(b) by 0 days.

(21) Appl. No.: 15/754,232

(22) PCT Filed: Aug. 2, 2016

(86) PCT No.: PCT/EP2016/068447
§ 371 (c)(1),
(2) Date: Feb. 21, 2018

(87) PCT Pub. No.: WO2017/032570
PCT Pub. Date: Mar. 2, 2017

(65) Prior Publication Data
US 2018/0248343 A1      Aug. 30, 2018

(30) Foreign Application Priority Data
Aug. 25, 2015   (FR) ..................................... 15 57905

(51) Int. Cl.
*H01H 33/04*  (2006.01)
*H02B 1/20*   (2006.01)
(Continued)

(52) U.S. Cl.
CPC ........... *H02B 13/025* (2013.01); *H01H 33/04* (2013.01); *H02B 1/46* (2013.01); *H02B 1/20* (2013.01); *H02G 5/02* (2013.01)

(58) Field of Classification Search
CPC ........ H01H 33/04; H01H 31/003; H01H 9/34; H01H 9/36; H02B 1/46; H02B 1/20; H02B 13/025; H02B 13/065; H02G 5/02
(Continued)

(56) References Cited

U.S. PATENT DOCUMENTS 2,106,565 A * 1/1938 Frank ....................... H02G 5/02
                                                    174/119 R
2,314,693 A * 3/1943 Dickinson ............ H01H 31/127
                                                    218/34
(Continued)

FOREIGN PATENT DOCUMENTS

CN         201315415 Y        9/2009
CN         202307611 U        7/2012
(Continued)

OTHER PUBLICATIONS

International Search Report with Translation and Written Opinion dated Oct. 20, 2016, for International Application No. PCT/EP2016/068447, filed Aug. 2, 2016, 14 pages.

*Primary Examiner* — Truc T Nguyen
*Assistant Examiner* — William A Bolton
(74) *Attorney, Agent, or Firm* — Christensen O'Connor Johnson Kindness PLLC

(57) ABSTRACT

This electric arc extinguishing device for a three-phase power distribution system comprises at least one metal strip (6) and at least one insulating support (7) on which the strip is mounted and comprising means for attaching the device between current distribution bars extending from side to side, the support comprising lateral faces (11) bearing against said bars, the strip being mounted on the support in such a way as to be internally offset relative to said lateral faces.

10 Claims, 5 Drawing Sheets

(51) Int. Cl.
*H02B 1/46* (2006.01)
*H02B 13/025* (2006.01)
*H02G 5/02* (2006.01)

(58) Field of Classification Search
USPC ............... 218/1, 12, 14, 37, 55, 67, 75, 80;
200/15, 16 F, 48 KB, 254
See application file for complete search history.

(56) References Cited

U.S. PATENT DOCUMENTS

| | | | | |
|---|---|---|---|---|
| 2,588,195 | A | * 3/1952 | Ballou | H01H 9/36 |
| | | | | 218/146 |
| 3,182,381 | A | * 5/1965 | Johnston | H02G 5/02 |
| | | | | 29/885 |
| 2015/0255963 | A1 | * 9/2015 | Andreoletti | H02B 1/46 |
| | | | | 361/624 |
| 2016/0190780 | A1 | * 6/2016 | Faber | H02B 13/025 |
| | | | | 361/611 |

FOREIGN PATENT DOCUMENTS

| | | |
|---|---|---|
| CN | 202454464 U | 9/2012 |
| DE | 11 91 458 B | 4/1965 |
| DE | 28 13 693 A1 | 10/1979 |
| DE | 43 28 241 A1 | 2/1995 |
| FR | 2 241 861 A1 | 3/1975 |
| FR | 3 017 005 A1 | 7/2015 |
| JP | 2014-117078 A | 12/2012 |
| JP | 2014 204632 A | 10/2014 |

* cited by examiner

PRIOR ART

FIG.6
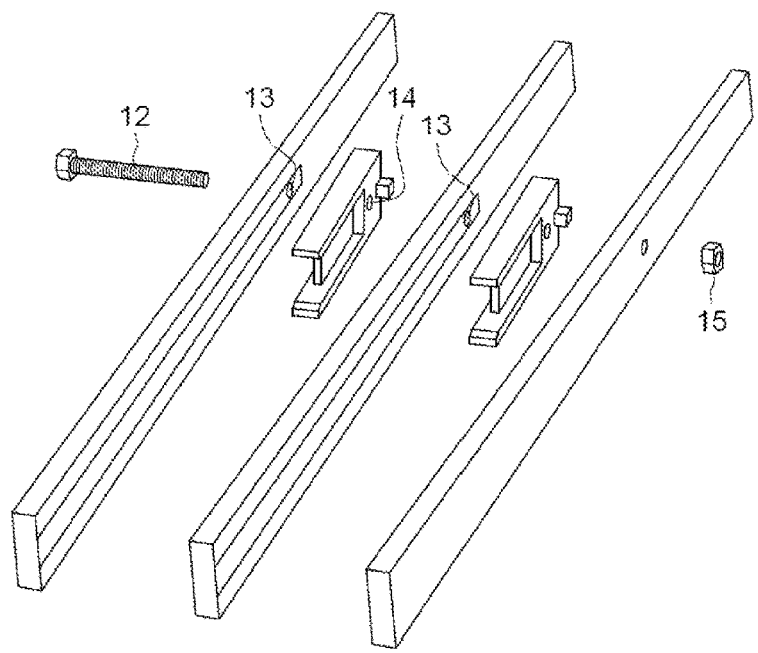
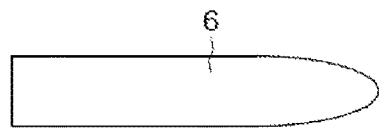
FIG.7a
FIG.7b
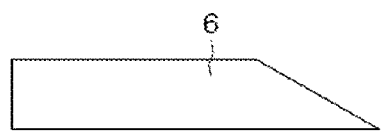
FIG.7c

ELECTRIC ARC EXTINGUISHING DEVICE FOR A THREE-PHASE POWER DISTRIBUTION SYSTEM AND CORRESPONDING POWER DISTRIBUTION SYSTEM

The invention generally relates to three-phase electrical power distribution systems and, in particular, electrical power distribution systems equipped with current distribution bars.

It relates more particularly to an electric arc extinguishing device for extinguishing electric arcs likely to be propagated along distribution bars.

A particularly useful application of the invention relates to electrical power distribution systems based on the use of current distribution bars provided in electrical power distribution cabinets or cores of aircraft.

However, the invention also applies to three-phase electrical power distribution systems in all types of equipment, notably in batteries, converters, e.g. AC/DC converters, etc.

As is known, an electrical power distribution network within an aircraft has a pyramidal structure.

Electrical power is first of all produced using a part of the power supplied by the aircraft's engines for driving electrical power generators. The electrical power generated is supplied to distribution cabinets, also referred to as distribution "cores", to be then redistributed either to loads, or to secondary distribution boxes, with different amperages. Three-phase electrical distribution bars, also known as "bus-bars," are used for conveying the currents within the distribution cabinet. The powers conveyed within the cabinet are relatively significant. They may reach values of the order of a megawatt.

The cross section of the distribution bars determines the maximum current that can safely flow in the bars.

Each primary or secondary distribution cabinet incorporates distribution components, some of which have the function of switching the energy to a primary distribution bar, as is the case for the line contactors, to electrical loads on board the aircraft or even to secondary distribution subnetworks which again redistribute the energy to loads of lesser power. Other distribution components have the function of protecting the network notably in case of electrical faults, such as a short circuit.

Systematically, each cable that exits a distribution cabinet for distributing the electrical power is protected either by a circuit breaker, or by a fuse, or by a contactor breaker. The operation of these components is triggered from a current overload. The triggering time is inversely proportional to the overload current.

The switching element farthest upstream, i.e. the closest to the electrical source, consists of the line contactor. The protection farthest upstream of the electrical network is consequently that which monitors the generator and controls the line contactor. This protection is based on a measurement of the current in order to identify an overload and isolate the fault if no other protection downstream has been able to do so, consequently proving that the fault is located at the level of the primary network, between the line contactor and the protection devices located downstream. The protection provided at the level of the primary network may be triggered only after a sufficient duration for the protections located downstream to be able to operate in the event that the fault is located at their level. This triggering duration today may be a maximum of 5 seconds, which is sufficiently long to cause damage.

Thus, the protection provided at the level of the generator and the line contactor is the longest to be implemented. Accordingly, a fault appearing directly downstream, on the primary network may, taking into account the triggering time of this protection, cause damage before being isolated.

It will be noted, moreover, that the set of protection devices provided in the primary or secondary distribution cabinets does not make it possible to ensure a protection against all types of faults likely to be encountered in an electrical core.

Although they are effective for covering faults such as overcurrents or short circuits, some types of short circuits are, however, not covered by these protections.

For example, metal objects (screwdrivers, nuts, etc.) left in error in an electrical cabinet during a maintenance operation, are likely to cause short circuits when they come in contact with the electrical distribution bars. Such short circuits will not be seen by the protection devices of the primary network and are likely to cause the occurrence of electric arcs likely to be propagated along the distribution bars and cause significant damage likely to jeopardize the safety of the aircraft.

The destructive effect of an arc only occurs, however, when the arc is slowed down. In this case, it eats away the metal of the distribution bars ejecting the molten metal around it. Such is also the case when it encounters an obstacle, whether it is metal or an insulator.

Indeed it has been found that an electric arc that is propagated over distribution bars generally has a height of the order of 2 to 3 cm, for current, frequency and voltage values in the aeronautics field. This is the reason why it is necessary to provide a safety zone of about 3 to 4 cm around the distribution bars in the distribution cabinets for preventing an electric arc propagating over the bars from catching on a metal element of the cabinet, which may prove to be constraining.

The prior art has already provided solutions for imposing a trajectory on the arc, once created, and modifying its shape, notably, in order to confine it in a restricted volume.

Reference may be made in this respect to the unpublished patent application FR 1 451 860.

In the light of the foregoing, the aim of the invention is to confine the arc in an imposed trajectory and in a restricted volume while reducing its intensity so as to cause it to be extinguished.

Therefore the subject matter of the invention, according to a first aspect, is an electric arc extinguishing device for a three-phase electrical power distribution system comprising at least one metal blade and at least one insulating support on which the blade is mounted and including attachment means for attaching the device between two current distribution bars extending side by side, the support including lateral faces abutting against said bars, the blade being mounted on the support in such a way as to be internally offset with respect to said lateral faces.

Thus, when an arc is propagated along the distribution bars, the blade, which is insulated from the distribution bars, separates the arc into two arcs, which increases the voltage of the arc by consecutively reducing its current, until it is suppressed.

According to another feature of the arc extinguishing device, the latter includes a base provided with said attachment means and two arms extending in parallel from the base and including free ends via which an arc is propagated in the device, the blade extending from the base in the direction of the free end of the arms.

According to yet another feature, the base includes a transverse orifice for attaching the support onto the bars by means of a nut made of electrically insulating material.

In one embodiment, the support comprises polygonal or cylindrical lateral pins fitting into corresponding holes made in the bars.

A plate made of electrically insulating material may also be provided on at least one of the faces of the base.

According to yet another feature of the device according to the invention, the blade has a single end edge.

This edge may be rounded, beveled or triangular.

The subject matter of the invention, according to a second aspect, is also a three-phase electrical power distribution system, including a set of current distribution bars extending side by side and covered with an insulator and including opposing insulator-free zones.

This system comprises a set of electric arc extinguishing devices each mounted between two current distribution bars and each including at least one metal blade and at least one insulating support on which the blade is mounted, the device including attachment means for attaching the support onto the bars, the support including lateral faces abutting against said bars, the blade being mounted on the arms in such a way as to be internally offset with respect to said lateral faces.

Other objects, features and advantages of the invention will appear on reading the following description, given solely by way of non-restrictive example and referring to the attached drawings, in which:

FIG. 6 illustrates the mounting of the arc extinguishing device in FIG. 5;

FIGS. 7a through 7c are cross-sectional views of a blade illustrating various shapes of the blade of the device in FIG. 5;

Figure 1:
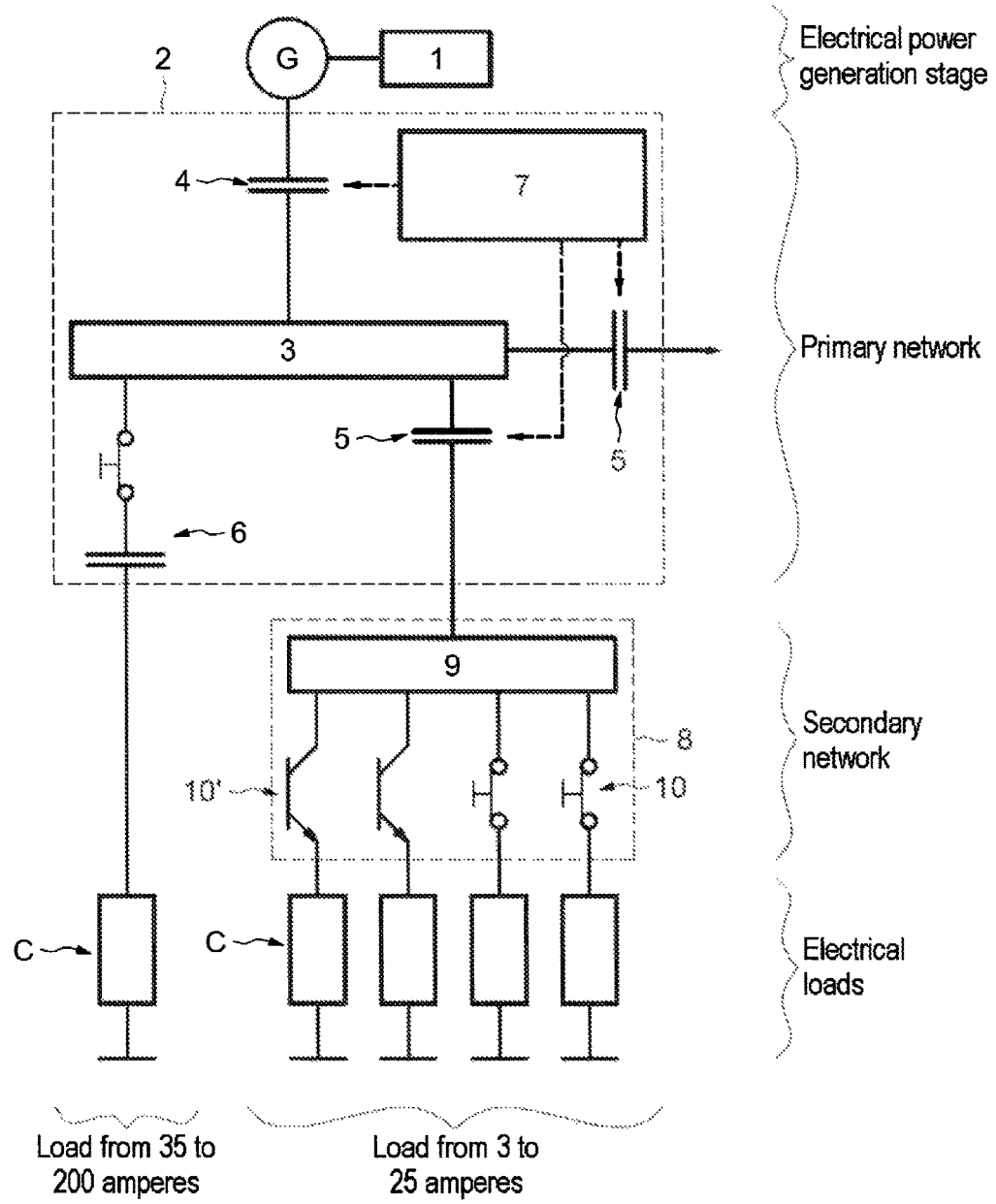
FIG. 1 illustrates the general architecture of an electrical power distribution network on board an aircraft.
Figure 2:
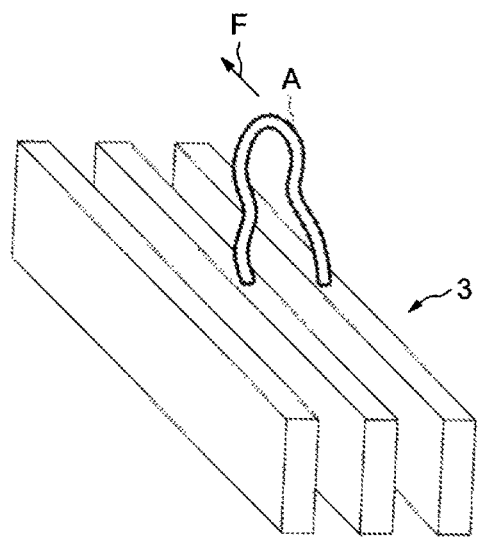
FIG. 2 depicts the propagation of an arc over uninsulated current distribution bars.

Reference will be made first of all to FIG. 1 which illustrates the general architecture of an electrical power distribution network for an aircraft.

The network first of all comprises an electrical power generation stage including a generator G, associated with a controller 1, which uses a part of the power supplied by the aircraft's engines for delivering electrical power, which is delivered to a primary network, to a secondary network and to electrical loads.

The primary network essentially comprises a distribution cabinet or core 2 in which three-phase current distribution bars 3 are provided which receive the electrical power delivered by the generator via a line switch 4 and which redistribute the electrical power to another primary network or to the secondary network or directly to the loads via respective contactors 5 or a contactor breaker 6 controlled by a monitoring device 7 of the contactors.

As for the secondary network, this also includes a secondary distribution cabinet 8 also including three-phase current distribution bars 9 directly powering the loads C via contactors 10 or switches 10'. For example, and as illustrated in FIG. 1, loads powered with amperages of between 35 and 200 amperes are directly powered by the primary distribution cabinet 2, while electrical loads C powered by currents with an amperage of between 3 and 25 amperes are connected to the secondary distribution cabinet 8.

As mentioned previously, it may happen that metal objects left in error in a distribution cabinet, and in particular in the primary distribution cabinet 2, come into contact with the primary distribution bars and generate the kind of short circuits that are not detected and taken into account by the protection devices of the primary network.

Such short circuits are likely to cause electric arcs that are propagated in the distribution bars and in the distribution cabinet and cause relatively significant damage.

Referring to FIG. 1, a current distribution bar is produced from an electrically conductive material, notably made of metal. For the distribution of three-phase electrical power, three current distribution bars $3a$, $3b$ and $3c$ are used arranged side by side, namely two lateral bars $3a$ and $3c$ and a median bar $3b$.

In a conventional electrical power distribution system, the current distribution bars $3a$, $3b$ and $3c$ are not insulated. Thus, an electric arc that is propagated along such uninsulated distribution bars follows Laplace's law and hence moves only in the direction of propagation of the loads (arrow F).

In this case, the electric arc A has an inverted U-shape, and is propagated more particularly above the bars. The electric arc A which is propagated projecting beyond the distribution bars is likely to reach metal zones of the electrical distribution core.

In order to confine the electric arc between the distribution bars and, hence, in a restricted volume, each bar is covered with an insulator. Advantageously this may be a non-organic insulator, e.g. an insulator produced from an epoxy paint, polyamide-11, or an insulator made of polyamide.

However, the bars $3a$, $3b$ and $3c$ comprise zones, such as 4 that are insulator-free and provided on the opposing faces of the bars.

Thus, the lateral face of the bar $3a$ turned toward the median bar $3b$ comprises an insulator-free zone 4, while the faces of the median bar $3b$ opposite each other are each provided with such an insulator-free zone 4.

Figure 3:
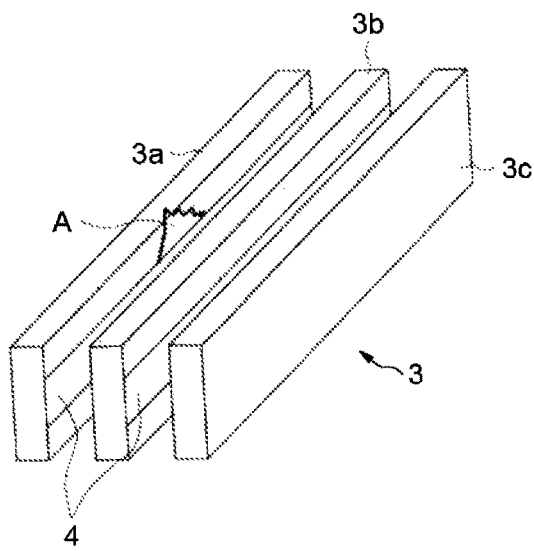
FIG. 3 depicts the propagation of an arc over distribution bars covered with an insulator and including opposing insulator-free zones.

Although not represented in FIG. 3, the other lateral bar $3c$ also comprises an insulator-free zone, opposite the corresponding zone of the median bar $3b$.

As can be seen, the insulator-free zones 4 extend longitudinally along the bars and hence form a strip delimiting an electrically conductive rail in the bars. Thus, as depicted in FIG. 3, an arc created in an electrical power distribution system is likely to be propagated only at the location of the insulator-free electrically conductive zones and is not able to be propagated in the insulated zones.

The electric arc is hence localized and confined in the inter-bar zones. The arc cannot thus catch on a nearby metal element.

It has thus been found that on board an aircraft, and in particular for current values encountered on board aircraft, the height of an electric arc being propagated along uninsulated bars is of the order of 2-3 cm. In contrast, for distribution bars that are insulated but provided with insulator-free zones and having a height of 15 mm, a spherical arc does not go beyond the bars or only goes beyond by a few mm above the bars, hence limiting the risks that the arc may come into contact with metal elements of the electrical distribution core.

Figure 4:
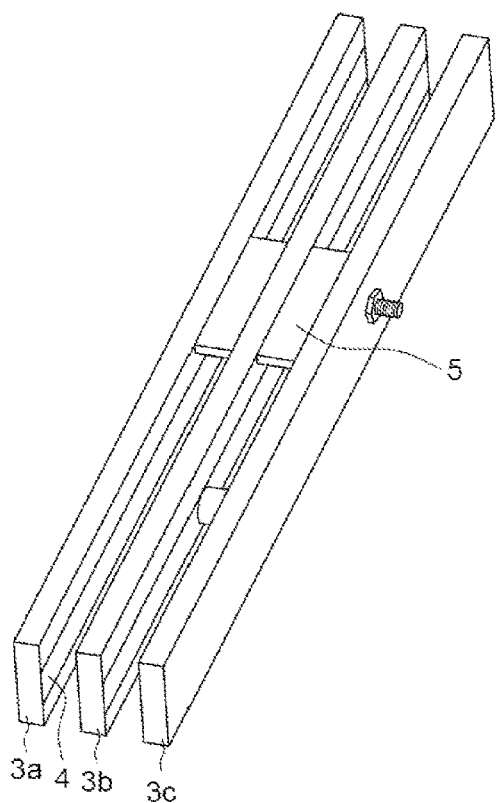
FIG. 4 is a perspective view of three-phase distribution bars equipped with a pair of arc extinguishing devices according to the invention.

Referring to FIG. 4, the electrical power distribution system is further equipped with an arc extinguishing device placed between each inter-bar zone.

In a three-phase distribution system, two arc extinguishing devices 5 will be provided.

Such a device essentially comprises a blade 6 mounted on a support 7 which is mounted on the bars so that the blade 6 extends along the direction of propagation of the arc, perpendicular to the general axis of the arc.

Figure 5:
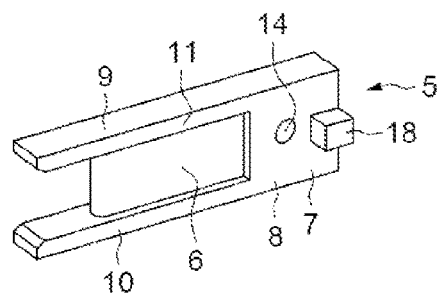
FIG. 5 is a perspective view of an arc extinguishing device in conformity with the invention.

In the embodiment in FIG. 5, the support 7 comprises a base 8 equipped with attachment means for attaching the device onto the bars and two arms 9 and 10 extending from the base 8 and between which the blade 6 is mounted.

The blade 6 thus extends from the base 8 in the direction of the free end of the arms while remaining set back from this end.

As can be seen, the arms 9 and 10 here have a rectangular cross section and thus comprise two longitudinal lateral faces, such as 11, which are each intended to abut against the current bars. The width of the arms 9 and 10 is, however, chosen so that the blade 6 is set back with respect to the lateral faces 11 so as to be spaced apart, on mounting, from the bars and to be insulated from the latter.

It will be noted that the support 7 may be mounted on the bars by any attachment means appropriate for the envisaged use.

In the example represented, the attachment is made using a bolt. As seen in FIG. 6, the attachment is made by means of a screw 12 which fits through holes 13 and 14 made both in the current bars and in the base 8 of the support 7 and a nut 15. The screw 12 and the nut 15 are produced from an electrically insulating material, e.g. polyether ether ketone (PEEK).

With regard to the support, the latter may also be produced from any appropriate insulating material, e.g. FR4 or FR5 epoxy, polycarbonate or PSU, etc.

As for the blade 6, this has to be produced in a metal material with a particularly high melting temperature, e.g. titanium, stainless steel, aluminum, tantalum, tungsten, or zirconium, according to the electrical power conveyed. The surface layer of the blade may advantageously include a protective layer made of the oxide of the metal material used for producing the blade.

It will be noted, however, that in addition to the high melting temperature, the metal material entering into the composition of the blade must also have good thermal diffusion so as to absorb the temperature of the arc which tends to cool when it is propagated along the blade.

Referring to FIGS. 7a through 7c, which illustrate a cross-sectional view of various blade shapes, the free end of the blade via which the arc is introduced into the arc extinguishing device may have various tapered shapes.

This end may be rounded (FIG. 7a), have a triangular shape (FIG. 7b) or be beveled (FIG. 7c).

The profile of the leading edge of the blade may also adopt various shapes.

It may thus, for example, adopt a V-shape, an inverted V-shape, a triangular shape, etc. In various implementations, it may also be provided with juxtaposed cutouts giving an overall serrated shape at the edge of the blade.

Figure 8:
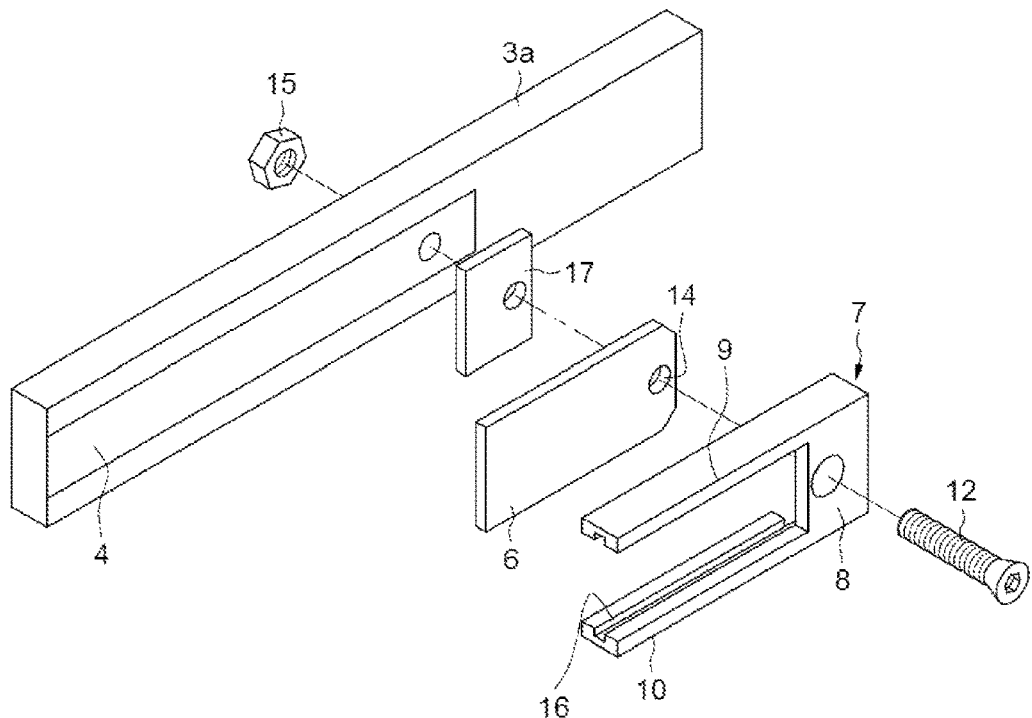
FIG. 8 illustrates another embodiment of an arc extinguishing device in conformity with the invention.

In the embodiment in FIG. 8, in which elements identical to those previously described bear the same numerical references, the support comprises two arms 9 and 10 each including a slot, such as 16, laterally offset with respect to the base 8 of the support.

In this case, an insulating plate 17 will be advantageously provided which lies flat against the blade so as to be interposed between the latter and the corresponding bar 3a.

It will be noted finally that in the embodiment in FIG. 5, the support is completed by an anti-rotation member 18 provided on each side of the support produced in the form of a pin extending laterally from the base 8 and having a polygonal or cylindrical shape. This pin is intended to fit into a correspondingly shaped orifice (not represented) made in the bars.

As can be seen, this member is produced in the form of a rectangular, prismatic or cylindrical pin.

As it is designed, the invention that has just been described, using a blade that comprises a single edge makes it possible to separate the arc into two arcs which move along the blade until they are suppressed. It will be noted in this respect that the length of the blade is chosen so as to dissipate the thermal energy of the arc to help weaken it and then to suppress it.

It has been found that this device makes it possible to cut off the arc in a few ms, i.e. in a much shorter time than the time necessary to trigger the generator's protection systems.

The invention thus makes it possible to cut off the electric arcs in the electrical boxes distributing high currents, to isolate faults notably generated by maintenance errors, and therefore to drastically reduce the damage caused by the latter by making it possible to contain the effects of powerful short circuits in a transparent manner for the generator or generators, within a compact amount of space.

It will be noted finally that the invention is not limited to the embodiments described.

Indeed, in the embodiments described with reference to FIGS. 1 through 8, the device is equipped with a blade mounted on an insulating support which is mounted between two current distribution bars placed side by side.

Figure 9:
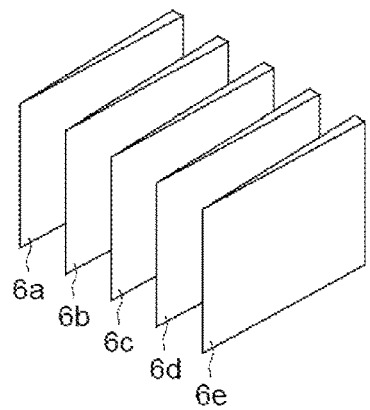
FIG. 9 illustrates another embodiment of an arc extinguishing device in conformity with the invention.

Referring to FIG. 9, as a variant, the device may include multiple blades, such as 6a, 6b, 6c, 6d and 6e, placed side by side for cutting off an arc.

These blades may be mounted on a common support attached between two bars and including multiple slots side by side, or be mounted on respective insulating supports, using multiple insulating supports similar to the supports previously described and in each of which a blade is mounted.

The invention claimed is:

1. An electric arc extinguishing device for a three-phase electrical power distribution system, characterized in that the extinguishing device comprises at least one metal blade and at least one insulating support on which the blade is mounted and including attachment means for attaching the device between current distribution bars extending side by side, the support including lateral faces abutting against said bars, the blade being mounted on the support in such a way as to be internally offset with respect to said lateral faces.

2. The device as claimed in claim 1, including a base provided with said attachment means and two arms extending in parallel from the base and including a free end via which an arc is propagated in the device, the blade extending from a base in the direction of the free end of the arms.

3. The device as claimed in claim 2, in which the base includes a transverse orifice for attaching the support onto the bars by means of a nut made of electrically insulating material.

4. The device as claimed in claim 3, in which the support comprises polygonal lateral pins fitting into corresponding holes made in the bars.

5. The device as claimed in claim 2, including a plate made of electrically insulating material on at least one of faces of the base.

6. The device as claimed in claim 1, in which the blade comprises a single end edge.

7. The device as claimed in claim 6, in which the end edge is rounded.

8. The device as claimed in claim 6, in which the end edge is beveled.

9. The device as claimed in claim 6, in which the end edge is triangular.

10. A three-phase electrical power distribution system including a set of current distribution bars extending side by side and covered with an insulator and including opposing insulator-free zones, characterized in that the power distribution device comprises a set of electric arc extinguishing devices each mounted between two current distribution bars and each including at least one metal blade and at least one insulating support on which the blade is mounted, the device including attachment means for attaching the support onto the bars, the support including external lateral faces abutting against the bars, the blade being mounted in such a way as to be internally offset with respect to the lateral faces.

* * * * *